United States Patent
Chan et al.

(10) Patent No.: US 11,860,660 B2
(45) Date of Patent: Jan. 2, 2024

(54) APPARATUS AND METHOD OF PERFORMING LOAD TRANSIENT FREQUENCY DETECTION FOR DYNAMICALLY MANAGING CONTROLLABLE CIRCUIT IN VOLTAGE REGULATOR

(71) Applicant: MediaTek Singapore Pte. Ltd., Singapore (SG)

(72) Inventors: Man Pun Chan, San Jose, CA (US); Hao-Ping Hong, San Jose, CA (US); Yung-Chih Yen, San Jose, CA (US); Chien-Hui Wang, Hsinchu (TW); Cheng-Hsuan Fan, Hsinchu (TW); Jian-Rong Huang, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/732,541

(22) Filed: Apr. 29, 2022

(65) Prior Publication Data
US 2022/0390973 A1   Dec. 8, 2022

Related U.S. Application Data

(60) Provisional application No. 63/195,734, filed on Jun. 2, 2021.

(51) Int. Cl.
G05F 1/575 (2006.01)
G05F 1/46 (2006.01)
H02M 3/157 (2006.01)

(52) U.S. Cl.
CPC ............. *G05F 1/575* (2013.01); *G05F 1/462* (2013.01); *H02M 3/157* (2013.01)

(58) Field of Classification Search
CPC .................................. G05F 1/575; G05F 1/462
See application file for complete search history.

(56) References Cited

U.S. PATENT DOCUMENTS

| | | | |
|---|---|---|---|
| 5,764,040 A | 6/1998 | Miller | |
| 2004/0232900 A1* | 11/2004 | Huang | H02M 3/158 323/282 |
| 2006/0043949 A1 | 3/2006 | Li | |
| 2009/0278516 A1 | 11/2009 | Bhagwat | |
| 2009/0309564 A1 | 12/2009 | Zafarana | |
| 2010/0315057 A1 | 12/2010 | Zambetti | |
| 2012/0212193 A1 | 8/2012 | Sreenivas | |
| 2013/0057240 A1 | 3/2013 | Zambetti | |

(Continued)

FOREIGN PATENT DOCUMENTS

| | | | | |
|---|---|---|---|---|
| CN | 105359400 A | | 2/2016 | |
| CN | 106415547 A | * | 2/2017 | ......... G06F 17/5063 |

(Continued)

*Primary Examiner* — Sisay G Tiku
(74) *Attorney, Agent, or Firm* — Winston Hsu

(57) ABSTRACT

A sub-circuit of a voltage regulator includes a load condition detection circuit and a controllable circuit. The load condition detection circuit is arranged to detect a load transient frequency of a load powered by the voltage regulator, and generate a control signal according to a detection result of the load transient frequency. The controllable circuit is arranged to receive the control signal, wherein an operational behavior of the controllable circuit dynamically changes in response to the control signal.

20 Claims, 3 Drawing Sheets

(56) References Cited

U.S. PATENT DOCUMENTS

| | | | |
|---|---|---|---|
| 2013/0322122 A1* | 12/2013 | Sigamani | H02M 1/4225 |
| | | | 363/13 |
| 2014/0002047 A1 | 1/2014 | Houston | |
| 2015/0035501 A1* | 2/2015 | Rozman | H02P 29/50 |
| | | | 322/29 |
| 2015/0160669 A1 | 6/2015 | Marschalkowski | |
| 2016/0301303 A1* | 10/2016 | Bari | H02M 3/156 |
| 2017/0149335 A1* | 5/2017 | Morroni | H02M 3/158 |
| 2017/0237345 A1* | 8/2017 | Manlove | H02M 3/156 |
| | | | 323/274 |
| 2018/0351473 A1* | 12/2018 | Zhang | H02M 3/1584 |
| 2019/0107853 A1* | 4/2019 | You | G05F 1/10 |
| 2020/0014299 A1* | 1/2020 | Sun | H02M 3/1588 |
| 2020/0363854 A1 | 11/2020 | Bemat | |
| 2021/0384821 A1* | 12/2021 | Chen | H02M 3/158 |

FOREIGN PATENT DOCUMENTS

| | | | | | |
|---|---|---|---|---|---|
| CN | 110011535 B | * | 1/2021 | | H02M 3/156 |
| CN | 112994448 A | * | 6/2021 | | H02M 3/156 |
| CN | 114667673 A | * | 6/2022 | | H02M 1/0009 |
| CN | 115437439 A | * | 12/2022 | | G05F 1/462 |
| CN | 115437440 A | * | 12/2022 | | H02M 1/0009 |
| JP | 2005130616 A | * | 5/2005 | | |
| TW | 521177 | | 2/2003 | | |

\* cited by examiner

APPARATUS AND METHOD OF PERFORMING LOAD TRANSIENT FREQUENCY DETECTION FOR DYNAMICALLY MANAGING CONTROLLABLE CIRCUIT IN VOLTAGE REGULATOR

CROSS REFERENCE TO RELATED APPLICATIONS

This application claims the benefit of U.S. Provisional Application No. 63/195,734, filed on Jun. 2, 2021. The content of the application is incorporated herein by reference.

BACKGROUND

The present invention relates to a voltage regulator design, and more particularly, to a voltage regulator using a load condition detection circuit for achieving dynamic control of a controllable circuit and an associated control method.

In an electronic device, a voltage regulator is used to supply stable power to electronic loads. The voltage regulator is typically designed to maintain an output voltage within specified limits. In some applications, the voltage regulator may support an adaptive voltage positioning (AVP) feature. Hence, inductor current (loading) is used as a feedback signal for implementing a loadline. For example, the load powered by the voltage regulator may be a central processing unit (CPU). A CPU load profile can be in different load transient frequency ranges. Some of the load transient frequency ranges can be over the control bandwidth of a pulse-width modulation (PWM) controller included in the voltage regulator. Therefore, the load transient response performance of the voltage regulator in these load transient frequency ranges would be degraded. If the PWM controller can respond differently in different load transient frequency ranges, the overall performance of the PWM controller can be improved without compromising the performance of other normal operation of the PWM controller. Thus, there is a need for an innovative voltage regulator design which is capable of optimizing the load transient response performance in different load transient frequency ranges.

SUMMARY

One of the objectives of the claimed invention is to provide a voltage regulator using a load condition detection circuit for achieving dynamic control of a controllable circuit and an associated control method.

According to a first aspect of the present invention, an exemplary sub-circuit of a voltage regulator is disclosed. The exemplary sub-circuit includes a load condition detection circuit and a controllable circuit. The load condition detection circuit is arranged to detect a load transient frequency of a load powered by the voltage regulator, and generate a control signal according to a detection result of the load transient frequency. The controllable circuit is arranged to receive the control signal, wherein an operational behavior of the controllable circuit dynamically changes in response to the control signal.

According to a second aspect of the present invention, an exemplary control method employed by a voltage regulator is disclosed. The exemplary control method includes: detecting a load transient frequency of a load powered by the voltage regulator, and generating a control signal according to a detection result of the load transient frequency; and dynamically changing an operational behavior of a controllable circuit included in the voltage regulator in response to the control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
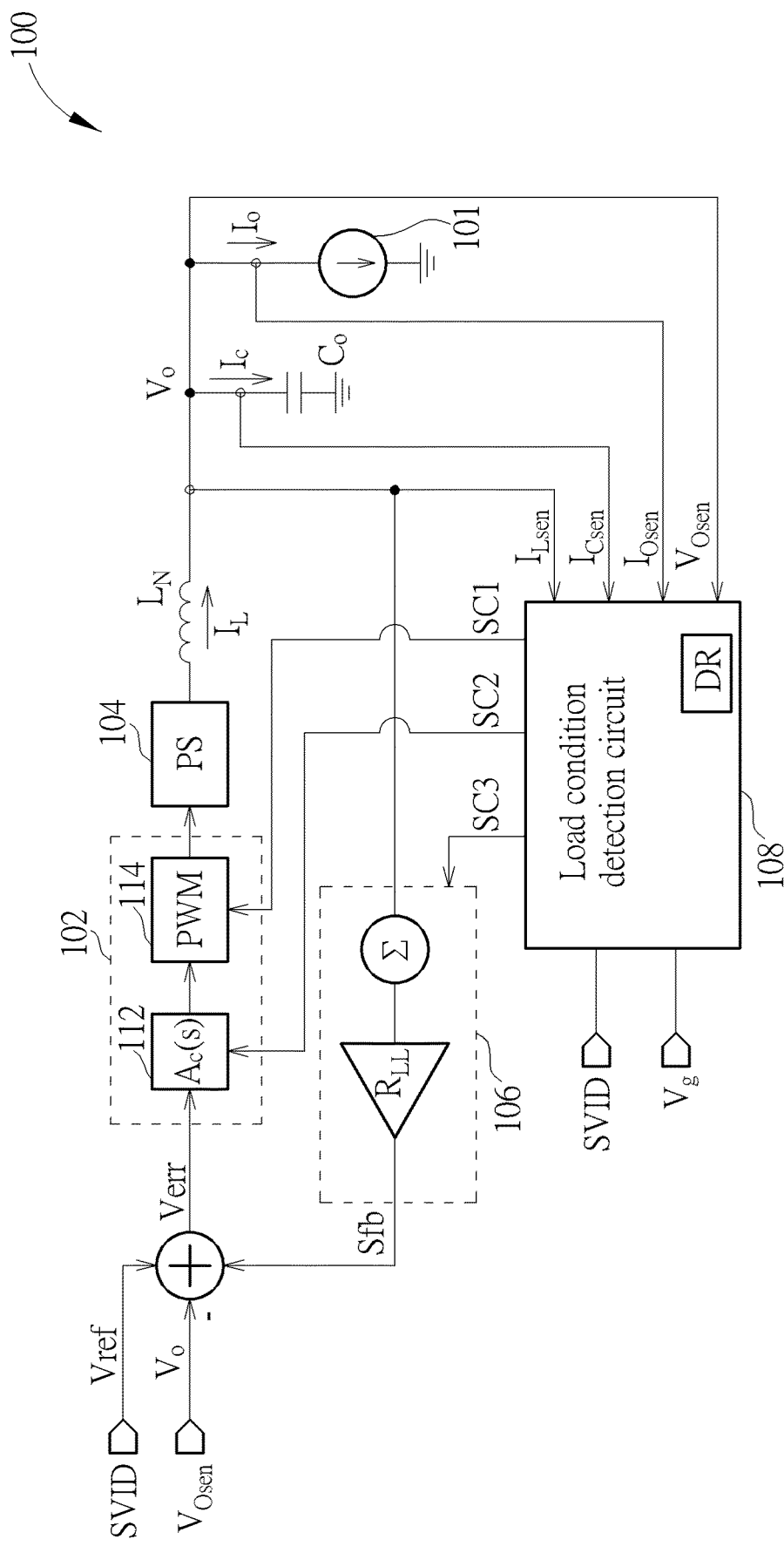
FIG. 1 is a diagram illustrating a voltage regulator with load transient frequency detection according to an embodiment of the present invention.

FIG. 1 is a diagram illustrating a voltage regulator with load transient frequency detection according to an embodiment of the present invention. The voltage regulator 100 may be a switching voltage regulator with adaptive voltage positioning (AVP). The voltage regulator 100 is capable of regulating the output voltage $V_o$ delivered to the load 101. For example, the load 101 may be a central processing unit (CPU). It should be noted that the load current $I_o$ supplied to the load 101 may vary in response to different load conditions of the load 101. Hence, when the load condition of the load 101 remains unchanged, the load current $I_o$ is unchanged.

As shown in FIG. 1, the voltage regulator 100 may include a controller circuit 102, a power stage circuit (labeled as "PS") 104, an inductor $L_N$, an output capacitor $C_o$, a loadline 106, and a load condition detection circuit 108. The controller circuit 102 may act as a pulse-width modulation (PWM) controller, and may include a filter circuit (labeled by "$A_c(s)$") 112 and a PWM signal generator circuit (labeled by "PWM") 114. For example, the filter circuit 112 may be an integrator circuit. The controller circuit 102 is a part of an output voltage feedback loop. In this embodiment, the controller circuit 102 operates in response to an error voltage $V_{err}$ that is derived from the output voltage $V_o$ (which is indicated by a sensed voltage signal $V_{Osen}$), a reference voltage $V_{ref}$ (which is set by a serial voltage identification (SVID) code), and a feedback signal $S_{fb}$ (which is generated from the loadline 106). Specifically, the PWM signal generator circuit 114 is arranged to deal with PWM control of the following power stage circuit 104. Hence, the PWM signal generator circuit 114 can regulate the output voltage $V_o$ delivered to the load 101 by controlling PWM pulses applied to the power stage circuit 104. For example, the power stage circuit 104 may include a high-side switch and a low-side switch controlled by PWM pulses generated from the PWM signal generator circuit 114. It should be noted that the voltage regulator 100 may be a multi-phase voltage regulator or a single-phase voltage regulator, depending upon actual application requirements. In a case where the voltage regulator 100 is a multi-phase voltage regulator having multiple sets of power stage circuit and inductor coupled between the controller circuit 102 and the load 101, the controller circuit 102 acts as a multi-phase PWM controller. In another case where the voltage regulator 100 is a single-phase voltage regulator having a single set of power stage circuit and inductor coupled between the controller circuit 102 and the load 101, the controller circuit 102 acts as a single-phase PWM controller.

The load condition detection circuit 108 is arranged to detect a load transient frequency (i.e. frequency of load current transient) of the load 101 powered by the voltage regulator 100, and generate at least one control signal according to a detection result DR of the load transient frequency. The voltage regulator 100 includes controllable circuit(s) arranged to receive control signal(s) generated from the load condition detection circuit 108, wherein an operational behavior of a controllable circuit dynamically changes in response to a received control signal. In this embodiment, the controller circuit 102 and the loadline 106 are controllable circuits, and the load condition detection circuit 108 outputs two control signals SC1, SC2 to the controller circuit 102, and outputs one control signal SC3 to the loadline 106.

Figure 2:
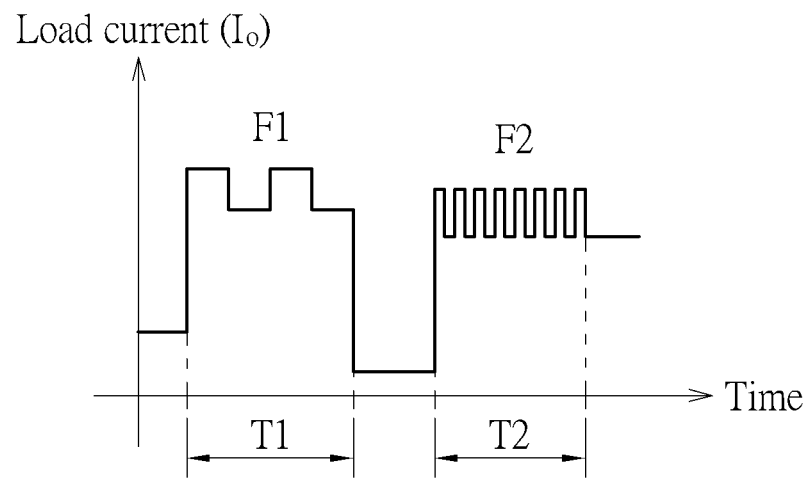
FIG. 2 is a waveform diagram of a load current according to an embodiment of the present invention.

The load condition detection circuit 108 detects the load transient frequency of the load 101 to generate the detection result DR. FIG. 2 is a waveform diagram of the load current $I_o$ according to an embodiment of the present invention. The detection result DR obtained by the load condition detection circuit 108 may indicate that the load 101 has load transient frequencies in a load transient frequency range F1 during the time period T1, and has load transient frequencies in another load transient frequency range F2 during the time period T2. In this embodiment, the load condition detection circuit 108 sets each control signal SC1/SC2/SC3 by assigning different control settings for different load transient frequency ranges, such that the associated controllable circuit has different operational behaviors in response to the different control settings. For example, the filter circuit 112 may employ different compensator values for different load transient frequency ranges, the PWM signal generator circuit 114 may employ different pulse patterns for different load transient frequency ranges, and the loadline 106 may employ different loadline resistance values $R_{LL}$ for different load transient frequency ranges. In this way, the load transient response performance in each load transient frequency range can be optimized without compromising the performance of other normal operation such as dynamic voltage identification (DVID).

As shown in FIG. 1, the load condition detection circuit 108 generates three control signals SC1, SC2, SC3 in response to the detection result DR. However, this is for illustrated purposes only, and is not meant to be a limitation of the present invention. In one alternative design, the load condition detection circuit 108 may be modified to generate only one of the control signals SC1, SC2, SC3. In another alternative design, the load condition detection circuit 108 may be modified to generate only two of the control signals SC1, SC2, SC3. To put it simply, any voltage regulator using the proposed load condition detection circuit to generate and output at least one control signal to at least one controllable circuit (e.g. PWM controller and/or loadline) falls within the scope of the present invention.

Regarding load transient frequency detection, the load condition detection circuit 108 is arranged to receive an input signal and detect the load transient frequency according to the input signal. For example, the input signal may be a sensed current signal $I_{Osen}$ that is derived from sensing the load current $I_o$ of the load 101. However, if the sensed current signal $I_{Osen}$ is not available, the load condition detection circuit 108 may use other signal to estimate the load transient frequency. Hence, the load condition detection circuit 108 receives an input signal that is not derived from sensing the load current $I_o$ of the load 101, and detects the load transient frequency according to the input signal. For example, the input signal used by load transient frequency detection may be a VID code (e.g. SVID code transmitted via a serial interface) that is indicative of the reference voltage $V_{ref}$ of the voltage regulator 100, or a supply voltage $V_g$ of the voltage regulator 100, or a sensed current signal $I_{Lsen}$ derived from sensing an inductor current $I_L$ of the inductor $L_N$ of the voltage regulator 100, or a sensed current signal $I_{Csen}$ derived from sensing a capacitor current $I_c$ of the output capacitor $C_o$ of the voltage regulator 100, or a sensed voltage signal $V_{Osen}$ derived from sensing the output voltage $V_o$ of the voltage regulator 100.

If the sensed current signal $I_{Osen}$ is not available, the load condition detection circuit 108 may detect the load transient frequency by referring to the input signal (e.g. SVID, $V_g$, $I_{Csen}$, or $V_{Osen}$) for measuring the time between two distinct periodic events. Taking the sensed current signal $I_{Lsen}$ selected as the input signal for example, the load condition detection circuit 108 may detect the load transient frequency by referring to the sensed current signal $I_{Lsen}$ for measuring the time between two distinct periodic events, where the two distinct periodic events are inductor current surge events. The average inductor current ave($I_L$) of the inductor $L_N$ is equal to a sum of the average capacitor current ave($I_c$) of the output capacitor $C_o$ and the average load current ave($I_o$) of the load 101 (i.e. ave($I_L$)=ave($I_o$)+ave($I_c$)). In a steady state, the average inductor current ave($I_L$) is equal to the average load current ave($I_o$) due to ave($I_c$)=0. When the load 101 changes from a light load condition to a heavy load condition, the inductor current $I_L$ has a surge current due to the sudden increase of the load current $I_o$. That is, after load transient happens, an inductor current surge event happens due to a surge current with a positive value. When the load 101 changes from a heavy load condition to a light load condition, the inductor current $I_L$ has a surge current due to the sudden decrease of the load current $I_o$. That is, after load transient happens, an inductor current surge event happens due to a surge current with a negative value. Hence, the time between two inductor current surge events can be used to estimate the load transient frequency.

Taking the sensed current signal $I_{Csen}$ selected as the input signal for example, the load condition detection circuit 108 may detect the load transient frequency by referring to the sensed current signal $I_{Csen}$ for measuring the time between two distinct periodic events, where the two distinct periodic events are output capacitor charging/discharging events. When the load 101 changes from a light load condition to a heavy load condition, the output capacitor $C_o$ is discharged due to the sudden increase of the load current $I_o$. When the load 101 changes from a heavy load condition to a light load condition, the output capacitor $C_o$ is charged due to the sudden decrease of the load current $I_o$. Hence, the time between two output capacitor charging/discharging events can be used to estimate the load transient frequency. In practice, since the capacitor current $I_c$ has a zero value in a steady state, measuring the periodic events of the capacitor current $I_c$ is relatively easy in the presence of load transient. This can be done by measuring the time between two zero-capacitor-current-crossing events (i.e. zero current crossing of the sensed current signal $I_{Csen}$).

Taking the sensed voltage signal $V_{Osen}$ selected as the input signal for example, the load condition detection circuit 108 may detect the load transient frequency by referring to the sensed voltage signal $V_{Osen}$ for measuring the time between two distinct periodic events, where the two distinct periodic events are output voltage overshoot/undershoot events. When the load 101 changes from a light load condition to a heavy load condition, the output voltage $V_o$ has an undershoot due to the sudden increase of the load current $I_o$. When the load 101 changes from a heavy load condition to a light load condition, the output voltage $V_o$ has an overshoot due to the sudden decrease of the load current $I_o$. Hence, the time between two output voltage overshoot/undershoot events can be used to estimate the load transient frequency.

Figure 3:
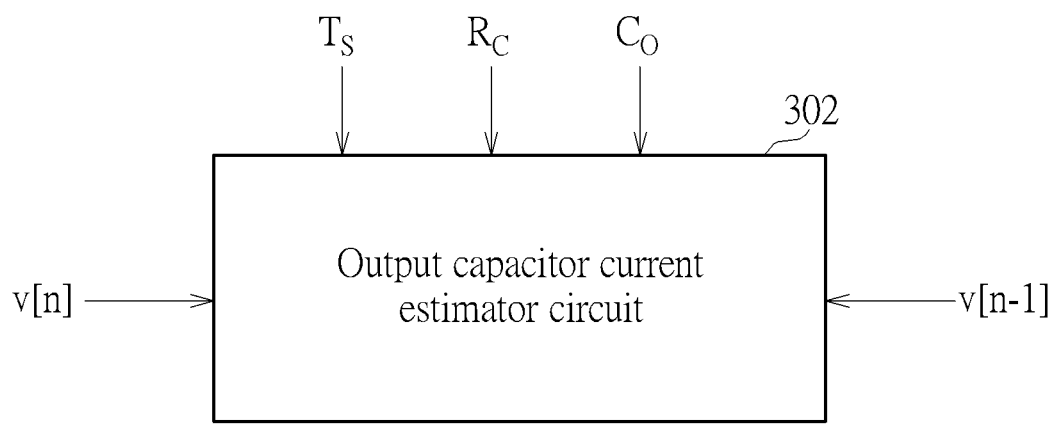
FIG. 3 is a diagram illustrating an output capacitor current estimator circuit according to an embodiment of the present invention.
Figure 4:
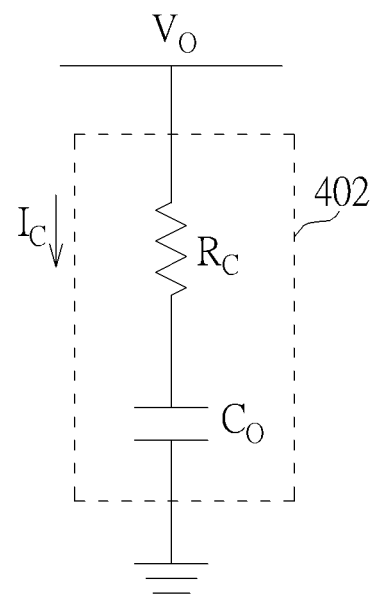
FIG. 4 is a diagram illustrating an equivalent circuit model of an output capacitor according to an embodiment of the present invention.

As mentioned above, the sensed current signal $I_{Csen}$ may be selected as the input signal used for load transient frequency detection. However, if the capacitor current $I_c$ cannot be easily sensed, the present invention proposes using digital computation to obtain an estimation of the capacitor current $I_c$. Please refer to FIG. 3 in conjunction with FIG. 4. FIG. 3 is a diagram illustrating an output capacitor current estimator circuit according to an embodiment of the present invention. FIG. 4 is a diagram illustrating an equivalent circuit model of an output capacitor according to an embodiment of the present invention. The output capacitor current estimator circuit 302 is implemented in the load condition detection circuit 108. Assume that the sensed voltage signal $V_{Csen}$ is selected as the input signal of the load condition detection circuit 108. The output capacitor current estimator circuit 302 is arranged to generate a plurality of output voltage samples v[n], v[n−1] by sampling the sensed voltage signal $V_{Osen}$ according to a sampling period $T_s$, determine an estimation of the capacitor current $I_c$ according to the output voltage samples v[n], v[n−1], the sampling period $T_s$, and equivalent series resistance $R_c$ and capacitance $C_o$ of the output capacitor 402, and detect the load transient frequency according to the estimation of the capacitor current. Since $T_s$, $R_c$, $C_o$ are known parameters, the estimation of the capacitor current can be easily done by using information given from the output voltage $V_o$.

Figure 5:
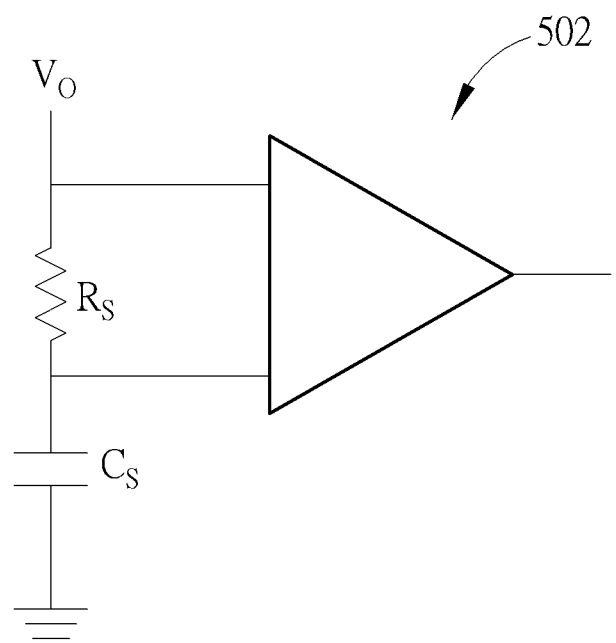
FIG. 5 is a diagram illustrating another output capacitor current estimator circuit according to an embodiment of the present invention.

The output capacitor current estimator circuit 302 is implemented by digital approach. However, this is for illustrative purposes only, and is not meant to be a limitation of the present invention. Alternatively, an output capacitor current estimator circuit may be implemented by analog approach, as illustrated in FIG. 5. The output capacitor current estimator circuit 502 is implemented in the load condition detection circuit 108. The output capacitor current estimator circuit 502 employs the same RC circuit in FIG. 4 with the same RC constant, i.e., $R_C \times C_O = R_S \times C_S$. Hence, if the capacitor current $I_c$ cannot be easily sensed, the output capacitor current estimator circuit 502 measures the voltage across $R_S$ to obtain an estimation of the capacitor current $I_c$, such that the load transient frequency can be detected according to the estimation of the capacitor current $I_c$.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sub-circuit of a voltage regulator comprising:
a load condition detection circuit, arranged to detect a load transient frequency of a load powered by the voltage regulator, and generate a control signal according to a detection result of the load transient frequency, wherein the load transient frequency is a frequency of load current transient of the load; and
a controllable circuit, arranged to receive the control signal, wherein an operational behavior of the controllable circuit dynamically changes in response to the control signal.

2. The sub-circuit of claim 1, wherein the load condition detection circuit is arranged to receive an input signal that is derived from sensing a load current of the load, and detect the load transient frequency according to the input signal.

3. The sub-circuit of claim 1, wherein the load condition detection circuit is arranged to receive an input signal that is not derived from sensing a load current of the load, and detect the load transient frequency according to the input signal.

4. The sub-circuit of claim 3, wherein the load condition detection circuit is arranged to detect the load transient frequency by referring to the input signal for measuring time between two distinct periodic events.

5. The sub-circuit of claim 3, wherein the input signal is a voltage identification (VID) code that is indicative of a reference voltage of the voltage regulator.

6. The sub-circuit of claim 3, wherein the input signal is a supply voltage of the voltage regulator.

7. The sub-circuit of claim 3, wherein the input signal is derived from sensing an inductor current of an inductor of the voltage regulator.

8. The sub-circuit of claim 7, wherein the load condition detection circuit is arranged to detect the load transient frequency by referring to the input signal for measuring time between two distinct periodic events, where the two distinct periodic events comprise an inductor current surge event.

9. The sub-circuit of claim 3, wherein the input signal is derived from sensing a capacitor current of an output capacitor of the voltage regulator.

10. The sub-circuit of claim 9, wherein the load condition detection circuit is arranged to detect the load transient frequency by referring to the input signal for measuring time between two distinct periodic events, where the two distinct periodic events comprise an output capacitor charging event or an output capacitor discharging event.

11. The sub-circuit of claim 3, wherein the input signal is derived from sensing an output voltage of the voltage regulator.

12. The sub-circuit of claim 11, wherein the load condition detection circuit is arranged to detect the load transient frequency by referring to the input signal for measuring time between two distinct periodic events, where the two distinct periodic events comprise an output voltage overshoot event or an output voltage undershoot event.

13. The sub-circuit of claim 11, wherein the load condition detection circuit comprises:
    an output capacitor current estimator circuit, arranged to:
        determine an estimation of a capacitor current of an output capacitor of the voltage regulator; and
        detect the load transient frequency according to the estimation of the capacitor current.

14. The sub-circuit of claim 1, wherein the load condition detection circuit is arranged to set the control signal by assigning different control settings for different load transient frequency ranges, and the controllable circuit has different operational behaviors in response to the different control settings.

15. The sub-circuit of claim 1, wherein the controllable circuit is a pulse-width modulation (PWM) controller.

16. The sub-circuit of claim 1, wherein the controllable circuit is a loadline of the voltage regulator.

17. A control method employed by a voltage regulator comprising:
    detecting a load transient frequency of a load powered by the voltage regulator, and generating a control signal according to a detection result of the load transient frequency, wherein the load transient frequency is a frequency of load current transient of the load; and
    dynamically changing an operational behavior of a controllable circuit included in the voltage regulator in response to the control signal.

18. The control method of claim 17, wherein detecting the load transient frequency of the load powered by the voltage regulator comprises:
    receiving an input signal that is derived from sensing a load current of the load; and
    detecting the load transient frequency according to the input signal.

19. The control method of claim 17, wherein detecting the load transient frequency of the load powered by the voltage regulator comprises:
    receiving an input signal that is not derived from sensing a load current of the load; and
    detecting the load transient frequency according to the input signal.

20. The control method of claim 17, wherein generating the control signal according to the detection result of the load transient frequency comprises:
    setting the control signal by assigning different control settings for different load transient frequency ranges, such that the controllable circuit has different operational behaviors in response to the different control settings.

* * * * *